Oct. 23, 1951  R. M. DEANESLY  2,572,321
PREPARATION OF FINE POWDERS FROM GEL MATERIALS
Filed Nov. 25, 1947
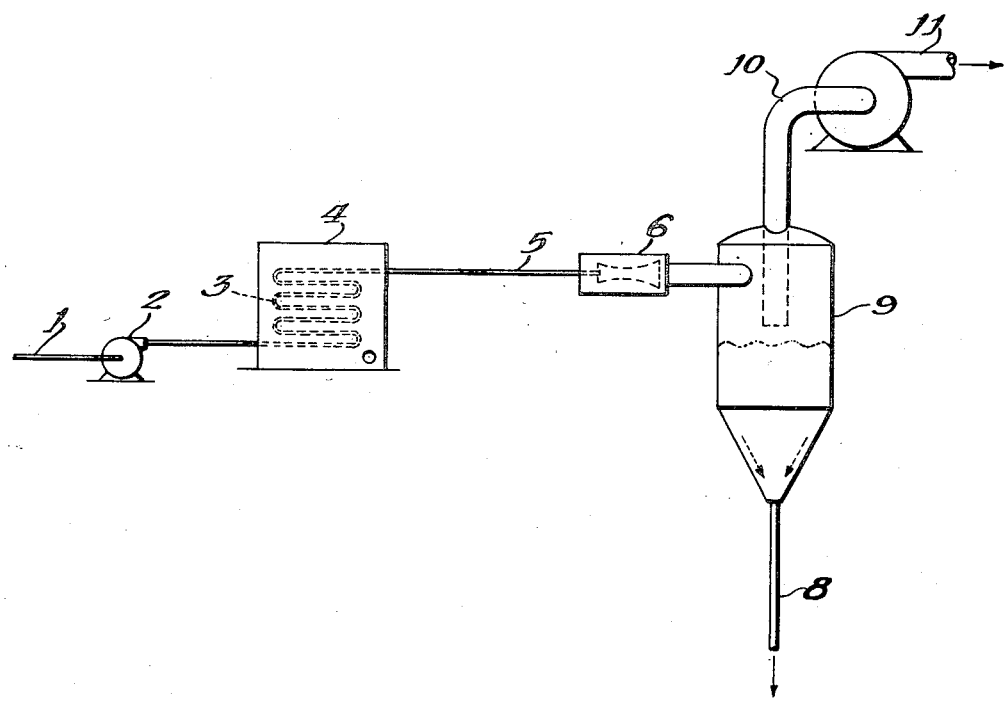
INVENTOR.
Richard M. Deanesly
BY Maynard P. Venema
Attorney Patented Oct. 23, 1951

2,572,321

UNITED STATES PATENT OFFICE 2,572,321

PREPARATION OF FINE POWDERS FROM GEL MATERIALS

Richard M. Deanesly, Hinsdale, Ill., assignor to Universal Oil Products Company, Chicago, Ill., a corporation of Delaware Application November 25, 1947, Serial No. 788,040

4 Claims. (Cl. 159—47)

This invention relates to the preparation of finely divided powders or particles from sol and gel forming substances. More particularly the invention is concerned with making so-called "sub-sieve" size powders from gel forming substances of controlled composition by passing a gel stream, with or without accompanying fluid, from a high pressure zone to a reduced pressure zone under conditions whereby sudden expansion provides a shattering and powdering of the gel forming substance.

The principal object of the invention is to provide a simple and inexpensive method of producing from gels finely divided powdered materials, that are of micron and sub-micron size. There are, of course, many and varied types of materials and compounds or mixtures of compounds which may be prepared into gels and it is not intended to limit the preparation of finely divided powdered materials under this invention to hydrogels only, or to any certain type of gel forming substances.

In the operation of this invention, the gel or gels from which the powder is to be prepared should be of a controllable type, with the water content, or other vaporizable component preferably of an amount such that the volume of vapor produced on the low pressure side is over twenty times the volume of the compressed feed on the high pressure side. The vaporizable content of the gel, as may be determined in carrying out the invention, will in part govern the degree of powdering and pulverization of the solid material in the pressure reduction step.

Broadly, the invention comprises feeding a gel, accompanied or not as may be required with additional fluid medium, through a Venturi throat, orifice, or other such more abrupt constriction from a zone at relatively high pressure to a zone at relatively low pressure, less than about half the high pressure, and the operation being conducted substantially adiabatically with the temperature and pressure of the material in the higher pressure zone being such that upon transfer to the lower pressure zone there is at least a twenty fold expansion in volume arising from the expansion of dissolved or absorbed gas and/or volatilization of the normally liquid components in the gel. Alternately, the invention may be defined by the conditions that will prevail under these limitations of pressure ratio, that will provide a linear velocity of flow of the mixture at the throat approaching the velocity of sound.

The aforesaid step of sudden adiabatic expansion, causing subdivision of the non-volatile components of the gel to sizes in the range from a few microns down, and mainly below 2 microns, is followed by one of separation of the powder from the expanded components, with the separation step preferably carried out without the expanded vaporous components condensing.

A rapid expansion providing at least twenty times the volume of the charge material is desirable, since below this value the efficiency of pulverization falls off rapidly.

For example, the invention may be operable with silica hydrogel of 85% water content heated to 380° C. at 250 atmospheres i. e. above the critical conditions for water, passing through a constriction into a zone at 25 atmospheres; or it may for example be operable with a drier gel of 30% water content mixed with carbon dioxide, heated to 15 atmospheres and 180° C. passing into a zone at 1 atmosphere.

Substances more tender to heat may be effectively disintegrated by employing vacuum on the low pressure side and reducing the high pressure side conditions accordingly, in accordance with the general limitation of twenty fold expansion under adiabatic conditions.

The particle separating means may be of the cyclone or centrifugal type, or it may be of the electrical precipitator type wherein high tension electric ionization and collection of the particles is effected. In order to carry powders and vapors satisfactorily through a separating apparatus, it is of course necessary that the vapor be carried therethrough with the finely divided particles without any substantial amount of condensation of the vapor. This feature of the operation may be accomplished by insulating the expansion and collecting zones as well as by maintaining the operating conditions such that the pressures and temperatures provide a substantial amount of superheat to the vapor stream.

The accompanying drawing illustrates diagrammatically a simplified method of carrying out the present invention to provide a finely divided powder from a gel stream, although it is to be understood that the apparatus shown is in no way limiting.

The gel stream is passed under pressure through pump 2 to a suitable coil 3 and heating chamber 4, and the stream is therein heated as hereinbefore noted to a temperature governed by the aforementioned requirements. For example, if a hydrogel of silica is being supplied to the apparatus at a pressure of the order of 1360 pounds per square inch gauge, then the stream may be heated to a temperature of the order of 580° F., a temperature just below the vaporization point of the water content of the gel stream at this pressure, and the stream thus leaves the heating apparatus 4 without vaporization occurring. The heated gel stream under pressure leaves the heating apparatus 4 through line 5, and is discharged through a suitable Venturi nozzle, orifice, or other abrupt constriction 6, into a zone of lower pressure. As the gel stream leaves the constriction 6, 40 to 45% of the liquid content of the stream instantly vaporizes, causing substantially a four hundred fold expansion in volume of the feed as a whole. The resulting mass of vapor and finely divided powder material passes in a single mixed phase stream to a separating apparatus 9. The separating apparatus, shown in this particular embodiment, is indicated to be of the centrifugal or cyclone type of particle separator, wherein the finely divided solid particles are centrifugally thrown to the sides of the chamber and collected in the lower portion thereof. The collected particles are then withdrawn through the lower outlet 8, while the vapor stream, substantially freed of the solid material, is withdrawn through a centrally placed vapor outlet and duct 10 connecting with a discharge fan or other type of exhauster 11.

The fan 11 may of course be omitted when the pressure maintained in the separator is above atmospheric.

From the foregoing description and from the accompanying drawing it may be seen that the operation disclosed by this invention is simple and inexpensive and that sub-micron sized powdered materials may be made from a gel in a manner that is far more simple than the usual grinding and crushing operations which are necessary to provide such finely divided powders. The apparatus illustrated in the drawing should not be limiting, as previously noted, the particle separating means may be of the electrical precipitator type, the mechanical filtering type, or of some other various form of dust collector, known in the art. The heating apparatus may be either batch or continuous and of any conventional form. The constriction at which the sudden adiabatic expansion takes place may be of adjustable cross-section, but during productive operation is required to be of such a size in relation to the flow of material that the pressure drop through it creates at least a twenty fold expansion in the volume of material flowing.

I claim:

1. A method for preparing a finely divided powder from a gel having vaporizable and solid components, which comprises, passing said gel in a fluid-like stream to a heating zone maintained at a superatmospheric pressure that is above the critical pressure of the vaporizable component of said gel, heating the mixture to a temperature of the order of the critical temperature of said vaporizable component and passing the thusly heated gel at said superatmospheric pressure through a restricted outlet to a reduced pressure zone, maintaining the latter at a sufficiently low pressure with respect to said heated and high pressure zone to provide substantially instantaneously and adiabatically an increased volume of said stream that is at least twenty times that in the first zone and effecting thereby a powdering of the solid component of said gel, into particles largely less than two microns in size, withdrawing the resulting powder and vapors through particle separating means and recovering said powder therefrom.

2. The method of claim 1 further characterized in that said gel is a hydrogel having at least a 50% water content.

3. A method of preparing finely divided powder from a hydrogel having less than a 50% water content which comprises maintaining said hydrogel in admixture with a water soluble gas having a substantially lower critical temperature and pressure than water, passing said mixture to a heating zone at a superatmospheric pressure hereinafter to be defined and heating said mixture therein to a temperature in the range of that necessary to vaporize water at said superatmospheric pressure, with said superatmospheric pressure being maintained substantially above that required to maintain said gas dissolved within the hydrogel at said temperature, passing said heated gel and gas mixture at said pressure through a restricted outlet to a reduced pressure zone, expanding said stream under adiabatic conditions, and effecting thereby a substantially instantaneous vaporization of said water content of said hydrogel and an expansion of said dissolved gas to provide a powdering of said hydrogel, withdrawing the resulting powder and volatile mixture through particle separating means and recovering said finely divided powder therefrom.

4. The method of claim 3 further characterized in that said gas mixed with said hydrogel comprises carbon dioxide and a differential between said high pressure and low pressure zones is maintained sufficient to expand the hydrogel and carbon dioxide stream under adiabatic conditions to increase at least twenty times the volume passed from said high pressure zone.

RICHARD M. DEANESLY.

REFERENCES CITED

The following references are of record in the file of this patent:

UNITED STATES PATENTS

| Number | Name | Date |
|---|---|---|
| 1,232,395 | Schmidt et al. | July 3, 1917 |
| 1,308,403 | Doonar | July 1, 1919 |
| 1,645,144 | Humphrey et al. | Oct. 11, 1927 |
| 1,819,354 | Behrman | Aug. 18, 1931 |
| 1,843,576 | McClure | Feb. 2, 1932 |
| 2,119,932 | Stam | June 7, 1938 |
| 2,249,767 | Kistler | July 22, 1941 |
| 2,316,670 | Colgate et al. | Apr. 13, 1943 |
| 2,351,376 | Ward | June 13, 1944 |
| 2,460,546 | Stephanoff | Feb. 1, 1949 |
| 2,467,769 | Morrow et al. | Apr. 19, 1949 |
| 2,475,984 | Owen | July 12, 1949 |

FOREIGN PATENTS

| Number | Country | Date |
|---|---|---|
| 239,753 | Great Britain | Sept. 17, 1925 |
| 667,359 | France | Oct. 16, 1929 |